United States Patent
Lee et al.

(10) Patent No.: US 8,406,560 B2
(45) Date of Patent: Mar. 26, 2013

(54) APPARATUS AND METHOD FOR GENERATING HIGH SENSITIVITY IMAGES IN DARK ENVIRONMENT

(75) Inventors: Kang-Eui Lee, Yongin-si (KR); Sung-Su Kim, Yongin-si (KR); Seong-Deok Lee, Suwon-si (KR); Won-Hee Choe, Seoul (KR); Young-Jin Yoo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 13/006,482

(22) Filed: Jan. 14, 2011

(65) Prior Publication Data

US 2011/0176729 A1    Jul. 21, 2011

(30) Foreign Application Priority Data

Jan. 15, 2010    (KR) .................. 10-2010-0004055

(51) Int. Cl.
*G06K 9/40*    (2006.01)

(52) U.S. Cl. ........ 382/274; 382/260; 382/275; 382/284; 382/294; 358/3.26; 358/3.27; 358/463; 358/450

(58) Field of Classification Search .................. 382/260, 382/274, 275, 278, 284, 294; 358/3.26, 3.27, 358/463, 540, 450
See application file for complete search history.

(56) References Cited

U.S. PATENT DOCUMENTS

| | | | |
|---|---|---|---|
| 5,802,214 A * | 9/1998 | Eschbach et al. ............. | 382/254 |
| 6,747,694 B1 | 6/2004 | Nishikawa et al. | |
| 7,398,270 B1 * | 7/2008 | Choi et al. ............................. | 1/1 |
| 7,431,417 B2 * | 10/2008 | Rodenas et al. ................. | 347/19 |
| 7,555,144 B2 * | 6/2009 | Gorsky et al. .................. | 382/110 |
| 7,859,274 B2 * | 12/2010 | Kim et al. ................ | 324/754.21 |
| 2009/0009614 A1 | 1/2009 | Kawai | |

FOREIGN PATENT DOCUMENTS

| | | |
|---|---|---|
| JP | 10-262182 | 9/1998 |
| JP | 11-317960 | 11/1999 |
| JP | 2000-350220 | 12/2000 |
| JP | 2002-057941 | 2/2002 |
| JP | 2003-174582 | 6/2003 |
| JP | 2004-297701 | 10/2004 |
| JP | 2006-197243 | 7/2006 |
| JP | 2007-049227 | 2/2007 |
| JP | 2008-277896 | 11/2008 |
| JP | 2009-017078 | 1/2009 |

\* cited by examiner

*Primary Examiner* — Yosef Kassa
(74) *Attorney, Agent, or Firm* — NSIP Law

(57) ABSTRACT

There is provided a method of and an apparatus for generating high sensitivity images in a low light level environment, the method including correcting an image acquired through short-time exposure in a low light level environment to an image corresponding to a reference exposure time defined for the low light level environment, the corrected image including a plurality of channels, detecting respective black levels for each of the channels, the detecting of the respective black levels being based on a black level intensity for the reference exposure time, adjusting the respective black levels for each of the channels of the corrected image to respective target black levels for each of the channels, and aligning a value of each of the channels using the respective target black levels.

20 Claims, 5 Drawing Sheets

APPARATUS AND METHOD FOR GENERATING HIGH SENSITIVITY IMAGES IN DARK ENVIRONMENT

CROSS-REFERENCE TO RELATED APPLICATION(S)

This application claims the benefit under 35 U.S.C.§119(a) of Korean Patent Application No. 10-2010-0004055, filed on Jan. 15, 2010, the entire disclosure of which is incorporated herein by reference for all purposes.

BACKGROUND

1. Field

The following description relates to image processing, and more particularly, to an apparatus and method for generating high sensitivity images in a dark environment.

2. Description of the Related Art

In order to acquire images through an image acquiring apparatus such as a camera, exposure times have to change depending on the brightness of surroundings. In other words, in order to acquire images with appropriate brightness/contrast in a dark environment, a long exposure time is needed to obtain a sufficient amount of light and maintain sensitivity of images, whereas, in a brighter environment, a relatively short exposure time is applied to prevent an excessive amount of light from being incident.

In a lighting environment when a longer exposure time is required, a higher likelihood of picture quality degradation exists due to movements of objects, camera shake, or the like. Thus, long exposure time, which is required in a dark environment (hereinafter, referred to as a "low light level environment"), raises the likelihood of picture quality degradation due to noise and makes acquisition of clear images difficult.

SUMMARY

The following description relates to a method and apparatus for generating high sensitivity images by reducing picture quality degradation in a low light level environment, such that images acquired through short-time exposure in a low light level environment are corrected to have a picture quality similar to that of images acquired through a long-time exposure.

In one general aspect, there is provided a method of generating high sensitivity images in a low light level environment, the method including correcting an image acquired through short-time exposure in a low light level environment to an image corresponding to a reference exposure time defined for the low light level environment, the corrected image including a plurality of channels, detecting respective black levels for each of the channels, the detecting of the respective black levels being based on a black level intensity for the reference exposure time, adjusting the respective black levels for each of the channels of the corrected image to respective target black levels for each of the channels, and aligning a value of each of the channels using the respective target black levels.

The method may further include that the correcting of the image includes correcting a brightness of the image acquired through short-time exposure, the correcting of the brightness including dividing the reference exposure time by a real exposure time of the image, and adding a result of the dividing of the reference exposure time by the real exposure time of the image as an offset to pixel values of the image.

The method may further include that the correcting of the image includes correcting a contrast of the image acquired through short-time exposure, the correcting of the contrast including dividing the reference exposure time by a real exposure time of the image, and multiplying a result of the dividing of the reference exposure time by the real exposure time of the image as a gain value by pixel values of the image.

The method may further include that the plurality of channels includes Red, Blue, and Green channels, the detecting of the respective black levels for each of the channels includes averaging pixel values of the Red and Blue channels of the corrected image, and pixels whose pixel values of the Green channel are within a predetermined numerical range of the black level of the Green channel and whose respective pixel values of the Red and Blue channels are below predetermined numerical ranges of the respective black levels of the Red and Blue channels are defined as black pixels.

The method may further include that the plurality of channels includes Red, Blue, and Green channels, the adjusting of the respective black levels for each of the channels includes adjusting the respective black levels of the Red and Blue channels based on the black level of the Green channel, and the aligning of the value of each of the channels includes stretching the adjusted respective black levels of the Green, Red and Blue channels in a low brightness direction by the respective target black levels of the Green, Red, and Blue channels.

The method may further include that the adjusting of the respective black levels for each of the channels further includes calculating the respective target black levels for the Green, Red and Blue channels, the calculating of the respective target black levels including dividing the respective black levels of the Red and Blue channels respectively by the black level of the Green channel.

In another general aspect, there is provided an apparatus for generating high sensitivity images in a low light level environment, the apparatus including a brightness/contrast corrector configured to correct an image acquired through short-time exposure in a low light level environment to an image corresponding to a reference exposure time defined for the low light level environment, the corrected image including a plurality of channels, a black level detector configured to detect respective black levels for each of the channels, the detected black levels being based on a black level intensity for the reference exposure time, a target black level calculator configured to adjust the respective black levels for each of the channels of the corrected image to respective target black levels for each of the channels, and an alignment unit configured to align a value of each of the channels using the respective target black levels.

The apparatus may further include that, to correct a brightness of the image acquired through short-time exposure, the brightness/contrast corrector is further configured to divide the reference exposure time by a real exposure time of the image, and add a result of the dividing of the reference exposure time by the real exposure time of the image as an offset to pixel values of the image.

The apparatus may further include that, to correct a contrast of the image acquired through short-time exposure, the brightness/contrast corrector is further configured to divide the reference exposure time by a real exposure time of the image, and multiply a result of dividing of the reference exposure time by the real exposure time of the image as a gain value to pixel values of the image.

The apparatus may further include that the plurality of channels includes Red, Blue, and Green channels, the black level detector is further configured to average pixel values of the Red and Blue channels of the corrected image to detect the respective black levels for each of the channels, and pixels whose pixel values of the Green channel are within a predetermined numerical range of the black level of the Green channel and whose respective pixel values of Red and Blue channels are below predetermined numerical ranges of the respective black levels of the Red and Blue channels are defined as black pixels.

The apparatus may further include that the plurality of channels includes Red, Blue, and Green channels, and the target black level calculator is further configured to adjust the respective black levels of the Red and Blue channels based on the black level of the Green channel.

The apparatus may further include that the alignment unit is further configured to stretch the adjusted respective black levels of the Green, Red and Blue channels in a low brightness direction by the respective target black levels of the Green, Red, and Blue channels to align the value of each of the channels.

The apparatus may further include that the target black level calculator is further configured to divide the respective black levels of the Red and Blue channels respectively by the black level of the Green channel to calculate the respective target black levels for the respective Green, Red, and Blue Channels.

In another general aspect, there is provided a method of generating an image in a low light level environment, the method including adjusting a brightness and a contrast of the image, the adjusting of the brightness and the contrast being based on a real exposure time required to acquire the image and a reference exposure time for which the image is acquired in the low level light environment with an appropriate brightness and contrast, detecting a black level of the adjusted image using black level intensity for the reference exposure time, calculating a target black level to adjust the black level of the adjusted image, and aligning the adjusted image the target black level.

The method may further include that the adjusting of the brightness of the image includes dividing the reference exposure time by the real exposure time, and adding a result of the dividing as an offset to pixel values of the image.

The method may further include that the adjusting of the contrast of the image includes dividing the reference exposure time by the real exposure time, and multiplying a result of the dividing as a gain value by pixel values of the image.

The method may further include that the detecting of the black level includes averaging pixel values of Red and Blue Channels of the adjusted image, and pixels whose pixel values of a Green channel of the adjusted image are with a predetermined numerical range of a black level of the Green channel and whose respective pixel values of the Red and Blue channels are below predetermined numerical ranges of respective black levels of the Red and Blue channels are defined as black pixels.

The method may further include that the calculating of the target black level includes adjusting respective black levels of Red and Blue channels of the adjusted image based on a black level of a Green channel of the adjusted image.

The method may further include that the aligning of the adjusted image includes stretching adjusted respective black levels of Green, Red and Blue channels of the adjusted image in a low brightness direction by respective target black levels of the Green, Red, and Blue channels.

The method may further include that the calculating of the target black level further includes calculating respective target black levels for the Green, Red and Blue channels, the calculating of the respective target black levels comprising dividing the respective black levels of the Red and Blue channels respectively by the black level of the Green channel.

Other features and aspects may be apparent from the following detailed description, the drawings, and the claims.

Figure 1:
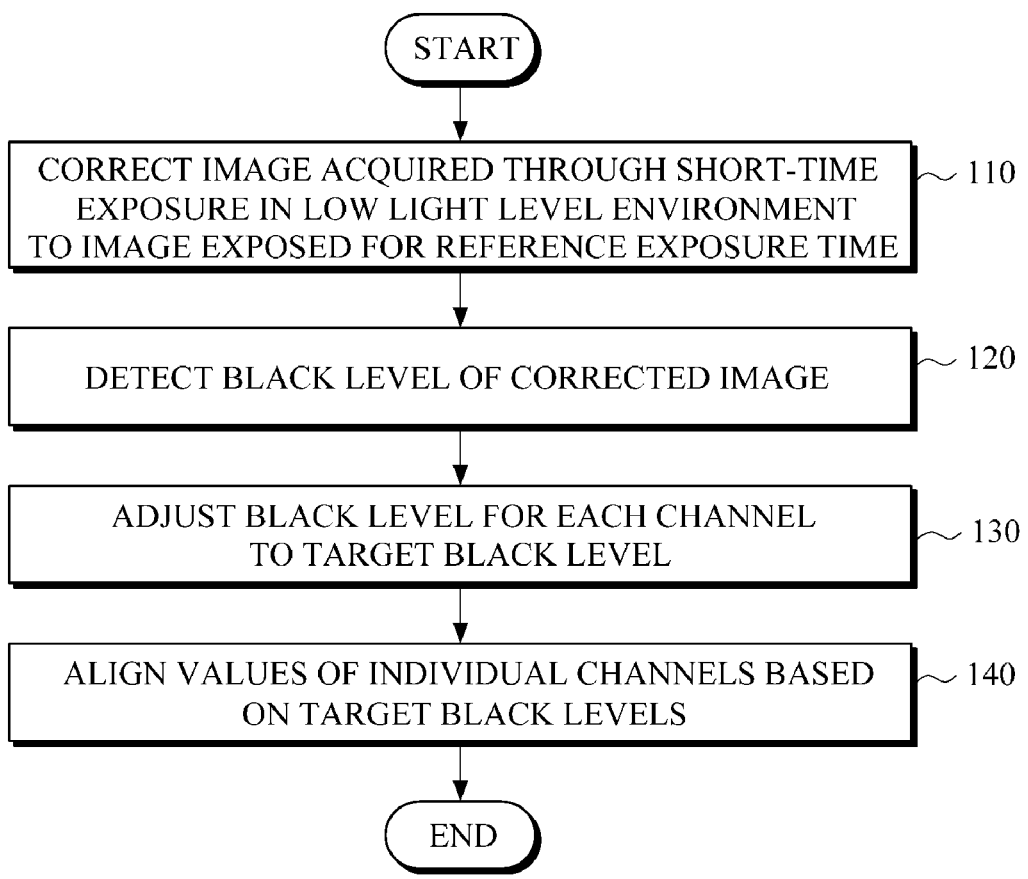
FIG. 1 is a flowchart illustrating an example of a method of generating high sensitivity images in a low light level environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a flowchart illustrating an example of a method of generating high sensitivity images in a low light level environment.

Referring to FIG. 1, an image acquired through short-time exposure in a low light level environment, information regarding a real exposure time of the image, and information regarding a reference exposure time are received. The received information may be used to correct the image to have picture quality that can be obtained when the reference exposure time is applied to the image (operation 110). The reference exposure time may be an exposure time for which images with appropriate brightness/contrast can be acquired in the low light level environment. The information regarding the reference exposure time may be obtained from known illumination-based standard exposure time information.

Figure 2:
FIG. 2 illustrates an example of a comparison between an image before brightness/contrast correction and the image after brightness/contrast correction.

According to an example, brightness correction may be performed by dividing a reference exposure time by a real exposure time of an image acquired through short-time exposure and adding the result of the division (that is, reference exposure time/real exposure time) as an offset to pixel values of the image. According to another example, contrast correction may be performed by multiplying the value of reference exposure time/real exposure time as a gain value by the pixel values of the image. According to still another example, brightness and contrast correction may be together performed by applying both the above-described offset and gain value to the image. Examples of images before and after brightness/contrast correction are illustrated in FIG. 2, which will be described later.

Then, a black level of the brightness/contrast corrected image may be detected using black level intensity for the reference exposure time (operation 120). The black level intensity for the reference exposure time may be obtained when off-line and may be used to obtain appropriate intensity a black level of a Green channel for the reference exposure time. Pixels whose pixel values of a Green channel are within a predetermined numerical range of the black level of the Green channel and whose respective pixel values of Red and Blue channels are below predetermined numerical ranges of respective black levels of Red and Blue channels of the black level are defined as black pixels. The pixel values of the Red and Blue channels of the pixels may be averaged to detect a black level of the brightness/contrast-corrected image. Details for detecting a black level will be described with reference to FIG. 3, later.

The black level for each channel may be then adjusted to a target black level (operation 130). For example, the black levels of the Red and Blue channels may be adjusted based on the black level of the Green channel. In more detail, target black levels for the respective channels may be calculated by dividing the black levels of the Red and Blue channels respectively by the black level of the Green channel. In this way, color balancing between Red and Blue channels may be achieved.

Successively, values of the Green, Red and Blue channels are aligned using the target black levels calculated for the respective Green, Red and Blue channels (operation 140). In more detail, channel-based alignment may be performed by stretching values of the Green, Red and Blue channels in a low brightness direction by the target black levels of the respective Green, Red and Blue channels.

In this way, the high sensitivity image generating method, according to the current example, may obtain high definition images with low picture quality degradation, even when an image acquiring apparatus, such as a camera, vibrates, or when objects move.

FIG. 2 illustrates an example of a comparison of an image 210 before brightness/contrast correction and an image 220 after brightness/contrast correction of the image 210.

It may be seen from FIG. 2 that the image 210 before brightness/contrast correction may be a dark image with low sensitivity, whereas the image 220 after brightness/contrast correction may be a high definition image with enhanced brightness and contrast.

Figure 3:
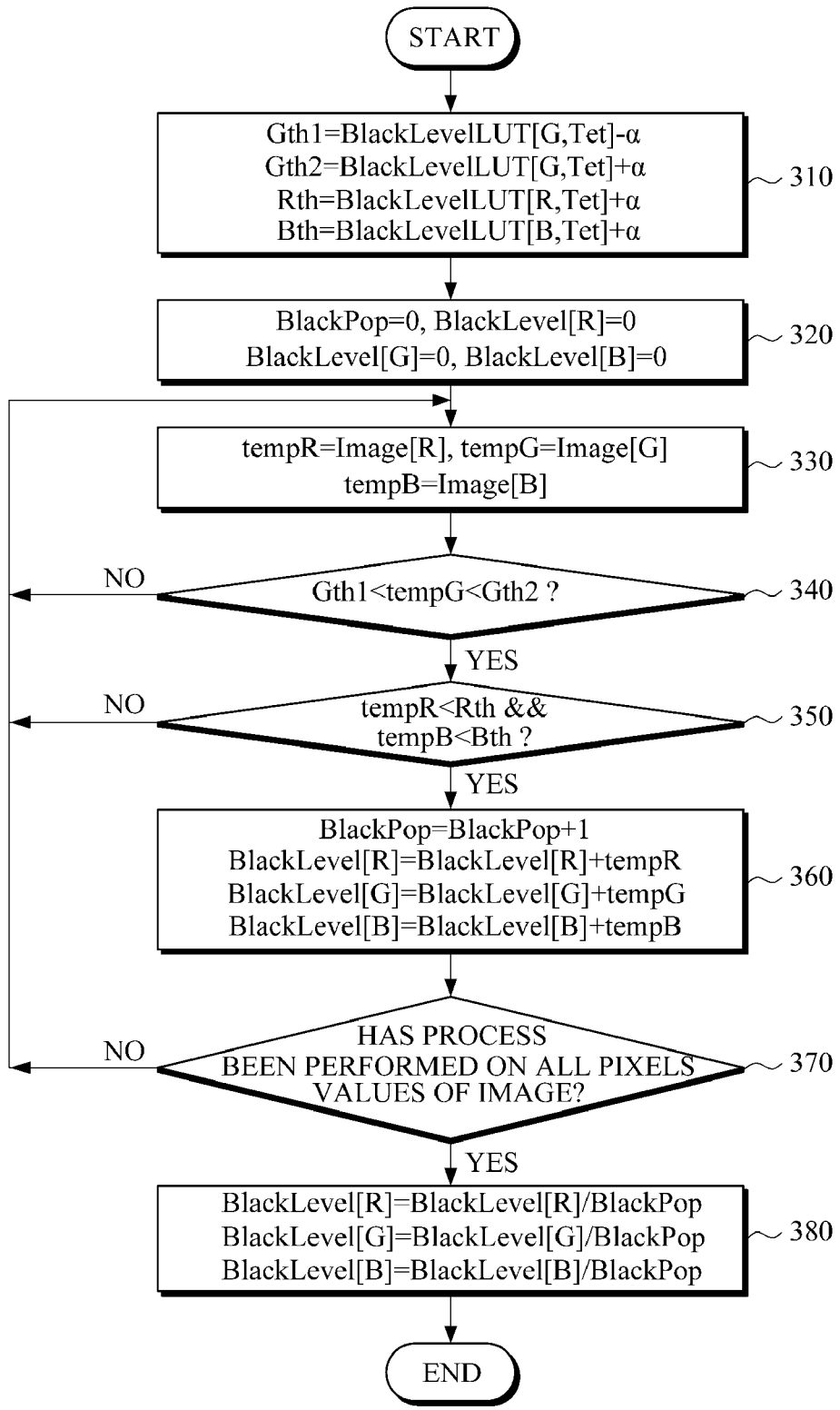
FIG. 3 is a flowchart illustrating an example of a method of detecting black levels.

FIG. 3 is a flowchart illustrating an example of a method of detecting black levels.

Referring to FIG. 3, in order to decide appropriate ranges of Green, Red and Blue channels, setting values Gth1, Gth2, Rth and Bth for the respective Green, Red and Blue channels are decided (operation 310), which are written in Equation 1.

$Gth1 = BlackLevelLUT[G, Tet] - \alpha$ $Gth2 = BlackLevelLUT[G, Tet] + \alpha$ $Rth = BlackLevelLUT[R, Tet] + \alpha$ $Bth = BlackLevelLUT[B, Tet] + \alpha$ [Equation 1]

Here, BlackLevelLUT represents a black level lookup table, Tet represents a reference exposure time, and BlackLevelLUT[G, TeT] represents a black level lookup table for a Green channel for the reference exposure time. $\alpha$ is a constant value for adjusting setting of each channel range.

Then, black levels for the respective Green, Red and Blue channels and BlackPop for deciding the black levels for the respective Green, Red and Blue channels are initialized to "0" (operation 320).

Next, pixel values for the Green, Red and Blue channels of a received image are read (operation 330) and it may be determined whether the pixel value of the Green channel is within a predetermined range (between Gth1 and Gth2) set in Equation 1. If the pixel value of the Green channel is within the predetermined range, it may be determined whether the pixel values of the Red and Blue channels are respectively below Rth and Bth set in Equation 1 (operation 350). If it is determined in operations 340 and 350 that the pixel value of the Green channel is not within the predetermined range and the pixel values of the Red and Blue channels are not below Rth and Bth, the process returns to operation 330 to read a next pixel value. Meanwhile, if it is determined in operations 340 and 350 that the pixel value of the Green channel is within the predetermined range and the pixel values of the Red and Blue channels are below Rth and Bth, BlackPop may be increased by 1 and the pixel value read in operation 330 may be added to the black levels for the Green, Red and Blue channels (operation 360).

The process may be repeated on all pixel values of the image. When the process has been performed on all the pixels values of the image (operation 370), the black levels for the Green, Red and Blue channels, which are calculated in operation 360, are divided by BlackPop and the results of the division are detected as black levels for the Green, Red and Blue channels (operation 380).

Figure 4:
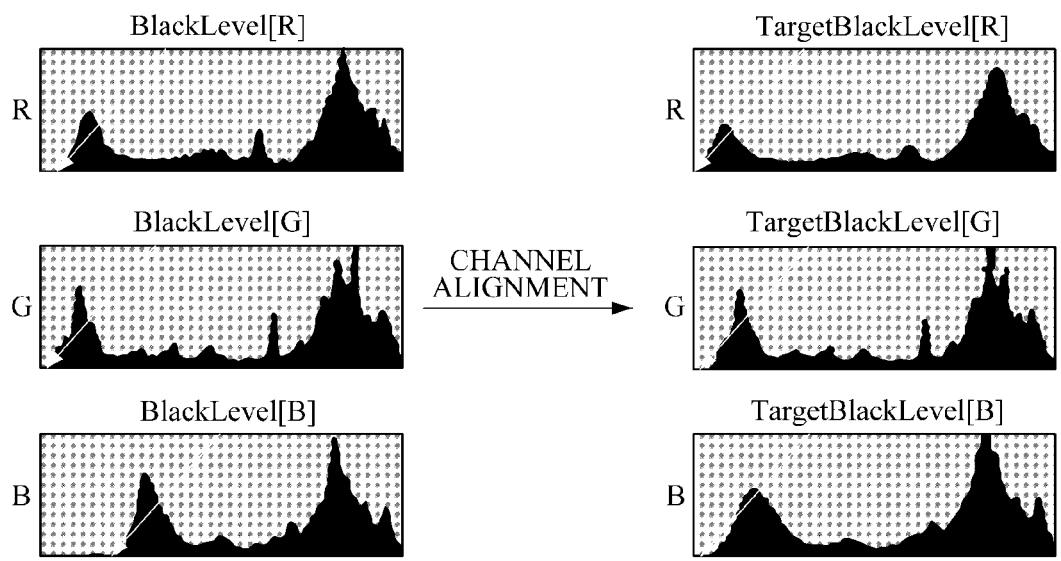
FIG. 4 illustrates graphs showing R, G and B values before and after channel-based alignment.

FIG. 4 illustrates graphs showing R, G and B values before and after channel-based alignment.

It can be seen from FIG. 4 that values of Red, Green and Blue channels are stretched in its low brightness direction by the calculated target black levels. Accordingly, it may be possible to prevent degradation in color balance due to brightness/contrast restoration at a low light level.

Figure 5:
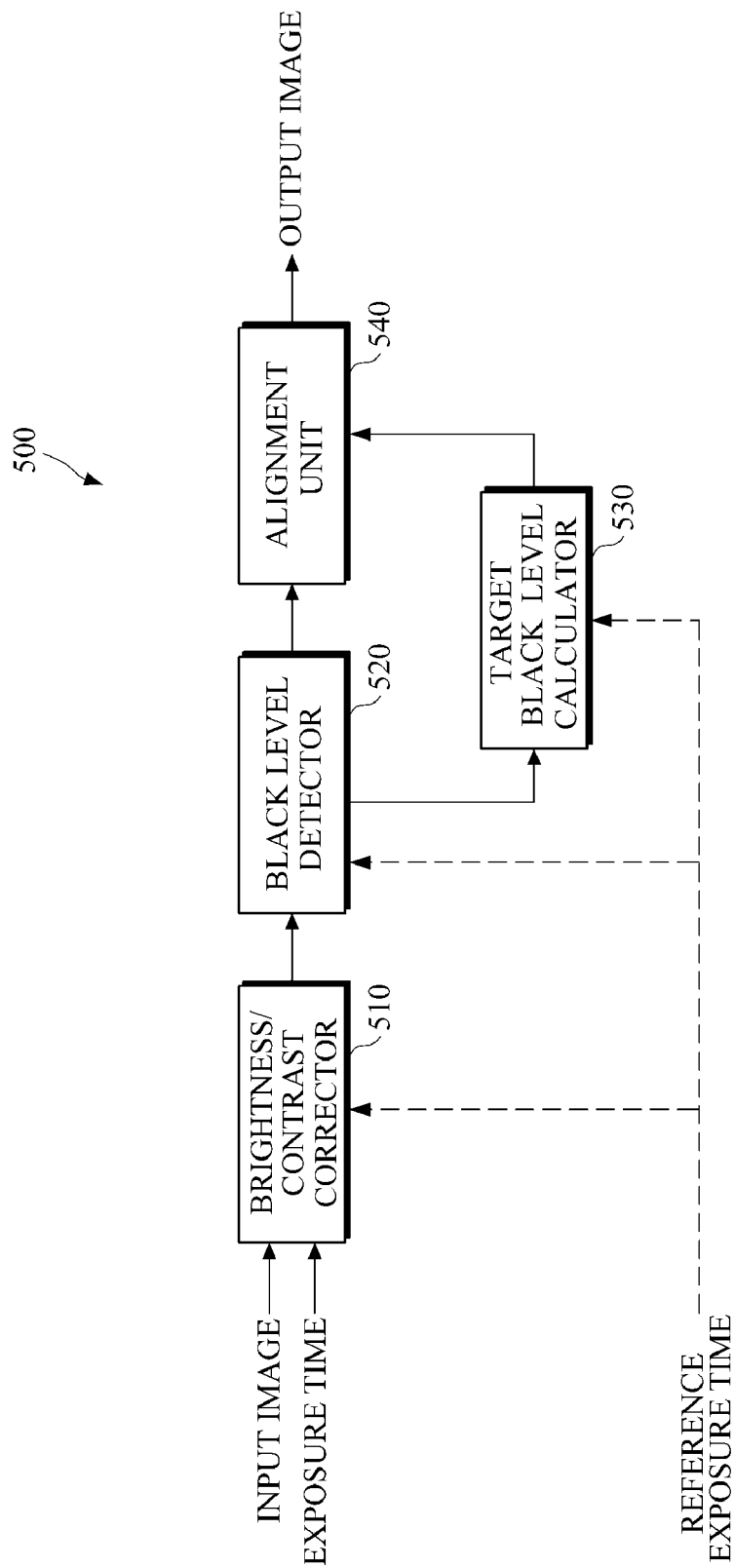
FIG. 5 is a diagram illustrating an apparatus configured to generate high sensitivity images in a low light level environment.

FIG. 5 is a diagram illustrating an apparatus 500 configured to generate high sensitivity images in a low light level environment.

Referring to FIG. 5, the high sensitivity image generating apparatus 500 may include a brightness/contrast corrector 510, a black level detector 520, a target black level calculator 530 and an alignment unit 540.

The brightness/contrast corrector 510 receives an image acquired through short-time exposure in a low light level environment, information regarding a real exposure time of the image, and information regarding a reference exposure time for acquiring high definition images in the low light level environment. The brightness/contrast corrector 510 corrects the image acquired through short-time exposure to an image corresponding to the reference exposure time. The reference exposure time may be an exposure time for which images with appropriate brightness/contrast can be acquired in the low light level environment. The information regarding the reference exposure time may be obtained from known illumination-based standard exposure time information.

According to an example, brightness correction may be performed by dividing a reference exposure time by a real exposure time of an image acquired through short-time exposure and adding the result of the division (that is, reference exposure time/real exposure time) as an offset to pixel values of the image. According to another example, contrast correction may be performed by multiplying the value of reference exposure time/real exposure time as a gain value by the pixel values of the image acquired through short-time exposure. According to still another example, brightness and contrast correction may be together performed by applying both the above-described offset and gain value to the image. Examples of images before and after brightness/contrast correction have been described above with reference to FIG. 2.

The black level detector 520 detects a black level of the image whose brightness/contrast has been corrected by the brightness/contrast corrector 510, using black level intensity for the reference exposure time. The black level intensity for the reference exposure time may be obtained when off-line and may be used to obtain appropriate intensity of a Green channel of the black level for the reference exposure time. Pixels whose pixel values of a Green channel are within a predetermined numerical range of the Green channel of the black level and whose pixel values of Red and Blue channels are below predetermined numerical ranges of Red and Blue channels of the black level are defined as black pixels. The pixel values of the Red and Blue channels of the pixels may be averaged to detect a black level of the brightness/contrast-corrected image. Details for detecting black levels have been described above with reference to FIG. 3.

The target black level calculator 530 adjusts a black level for each channel, which has been detected by the black level detector 520, to a target black level. For example, the target black level calculator 530 may adjust the black levels of the Red and Blue channels based on the black level of the Green channel. In more detail, the target black level calculator 530 may calculate target black levels for the respective channels by dividing the black levels of the Red and Blue channels respectively by the black level of the Green channel. In this way, color balancing between Red and Blue channels may be achieved.

The alignment unit 540 aligns values of the Green, Red and Blue channels using the target black levels calculated for the respective Green, Red and Blue channels. In more detail, the alignment unit 540 may perform channel-based alignment by stretching values of the Green, Red and Blue channels in its low brightness direction by the target black levels for the respective Green, Red and Blue channels.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating high sensitivity images in a low light level environment, the method comprising:
    correcting an image acquired through short-time exposure in a low light level environment to an image corresponding to a reference exposure time defined for the low light level environment, the corrected image including a plurality of channels;
    detecting respective black levels for each of the channels, the detecting of the respective black levels being based on a black level intensity for the reference exposure time;
    adjusting the respective black levels for each of the channels of the corrected image to respective target black levels for each of the channels; and
    aligning a value of each of the channels using the respective target black levels.

2. The method of claim 1, wherein the correcting of the image comprises:
    correcting a brightness of the image acquired through short-time exposure, the correcting of the brightness comprising:
        dividing the reference exposure time by a real exposure time of the image; and
        adding a result of the dividing of the reference exposure time by the real exposure time of the image as an offset to pixel values of the image.

3. The method of claim 1, wherein the correcting of the image comprises:
    correcting a contrast of the image acquired through short-time exposure, the correcting of the contrast comprising:

dividing the reference exposure time by a real exposure time of the image; and multiplying a result of the dividing of the reference exposure time by the real exposure time of the image as a gain value by pixel values of the image.

4. The method of claim 1, wherein:

the plurality of channels includes Red, Blue, and Green channels;

the detecting of the respective black levels for each of the channels comprises averaging pixel values of the Red and Blue channels of the corrected image; and pixels whose pixel values of the Green channel are within a predetermined numerical range of the black level of the Green channel and whose respective pixel values of the Red and Blue channels are below predetermined numerical ranges of the respective black levels of the Red and Blue channels are defined as black pixels.

5. The method of claim 1, wherein:

the plurality of channels includes Red, Blue, and Green channels;

the adjusting of the respective black levels for each of the channels comprises adjusting the respective black levels of the Red and Blue channels based on the black level of the Green channel; and the aligning of the value of each of the channels comprises stretching the adjusted respective black levels of the Green, Red and Blue channels in a low brightness direction by the respective target black levels of the Green, Red, and Blue channels.

6. The method of claim 5, wherein the adjusting of the respective black levels for each of the channels further comprises calculating the respective target black levels for the Green, Red and Blue channels, the calculating of the respective target black levels comprising dividing the respective black levels of the Red and Blue channels respectively by the black level of the Green channel.

7. An apparatus for generating high sensitivity images in a low light level environment, the apparatus comprising:

a brightness/contrast corrector configured to correct an image acquired through short-time exposure in a low light level environment to an image corresponding to a reference exposure time defined for the low light level environment, the corrected image comprising a plurality of channels;

a black level detector configured to detect respective black levels for each of the channels, the detected black levels being based on a black level intensity for the reference exposure time;

a target black level calculator configured to adjust the respective black levels for each of the channels of the corrected image to respective target black levels for each of the channels; and an alignment unit configured to align a value of each of the channels using the respective target black levels.

8. The apparatus of claim 7, wherein, to correct a brightness of the image acquired through short-time exposure, the brightness/contrast corrector is further configured to:

divide the reference exposure time by a real exposure time of the image; and add a result of the dividing of the reference exposure time by the real exposure time of the image as an offset to pixel values of the image.

9. The apparatus of claim 7, wherein, to correct a contrast of the image acquired through short-time exposure, the brightness/contrast corrector is further configured to:

divide the reference exposure time by a real exposure time of the image; and multiply a result of dividing of the reference exposure time by the real exposure time of the image as a gain value to pixel values of the image.

10. The apparatus of claim 7, wherein:

the plurality of channels comprises Red, Blue, and Green channels;

the black level detector is further configured to average pixel values of the Red and Blue channels of the corrected image to detect the respective black levels for each of the channels; and pixels whose pixel values of the Green channel are within a predetermined numerical range of the black level of the Green channel and whose respective pixel values of Red and Blue channels are below predetermined numerical ranges of the respective black levels of the Red and Blue channels are defined as black pixels.

11. The apparatus of claim 7, wherein:

the plurality of channels comprises Red, Blue, and Green channels; and the target black level calculator is further configured to adjust the respective black levels of the Red and Blue channels based on the black level of the Green channel.

12. The apparatus of claim 11, wherein the alignment unit is further configured to stretch the adjusted respective black levels of the Green, Red and Blue channels in a low brightness direction by the respective target black levels of the Green, Red, and Blue channels to align the value of each of the channels.

13. The apparatus of claim 11, wherein the target black level calculator is further configured to divide the respective black levels of the Red and Blue channels respectively by the black level of the Green channel to calculate the respective target black levels for the respective Green, Red, and Blue Channels.

14. A method of generating an image in a low light level environment, the method comprising:

adjusting a brightness and a contrast of the image, the adjusting of the brightness and the contrast being based on a real exposure time required to acquire the image and a reference exposure time for which the image is acquired in the low level light environment with an appropriate brightness and contrast;

detecting a black level of the adjusted image using black level intensity for the reference exposure time;

calculating a target black level to adjust the black level of the adjusted image; and aligning the adjusted image the target black level.

15. The method of claim 14, wherein the adjusting of the brightness of the image comprises:

dividing the reference exposure time by the real exposure time; and adding a result of the dividing as an offset to pixel values of the image.

16. The method of claim 14, wherein the adjusting of the contrast of the image comprises:

dividing the reference exposure time by the real exposure time; and multiplying a result of the dividing as a gain value by pixel values of the image.

17. The method of claim 14, wherein:

the detecting of the black level comprises averaging pixel values of Red and Blue Channels of the adjusted image; and pixels whose pixel values of a Green channel of the adjusted image are with a predetermined numerical range of a black level of the Green channel and whose respective pixel values of the Red and Blue channels are below predetermined numerical ranges of respective black levels of the Red and Blue channels are defined as black pixels.

18. The method of claim 14, wherein the calculating of the target black level comprises adjusting respective black levels of Red and Blue channels of the adjusted image based on a black level of a Green channel of the adjusted image.

19. The method of claim 18, wherein the aligning of the adjusted image comprises stretching adjusted respective black levels of Green, Red and Blue channels of the adjusted image in a low brightness direction by respective target black levels of the Green, Red, and Blue channels.

20. The method of claim 18, wherein the calculating of the target black level further comprises calculating respective target black levels for the Green, Red and Blue channels, the calculating of the respective target black levels comprising dividing the respective black levels of the Red and Blue channels respectively by the black level of the Green channel.

* * * * *